Jan. 12, 1960  G. ZIMMERMAN  2,920,421
SHEARS FOR SEVERING MOLD CHARGES OF PLASTIC GLASS
Filed May 31, 1957  2 Sheets-Sheet 1

INVENTOR.
GEORGE ZIMMERMAN
BY
ATTORNEYS

Jan. 12, 1960
G. ZIMMERMAN
2,920,421
SHEARS FOR SEVERING MOLD CHARGES OF PLASTIC GLASS
Filed May 31, 1957
2 Sheets-Sheet 2
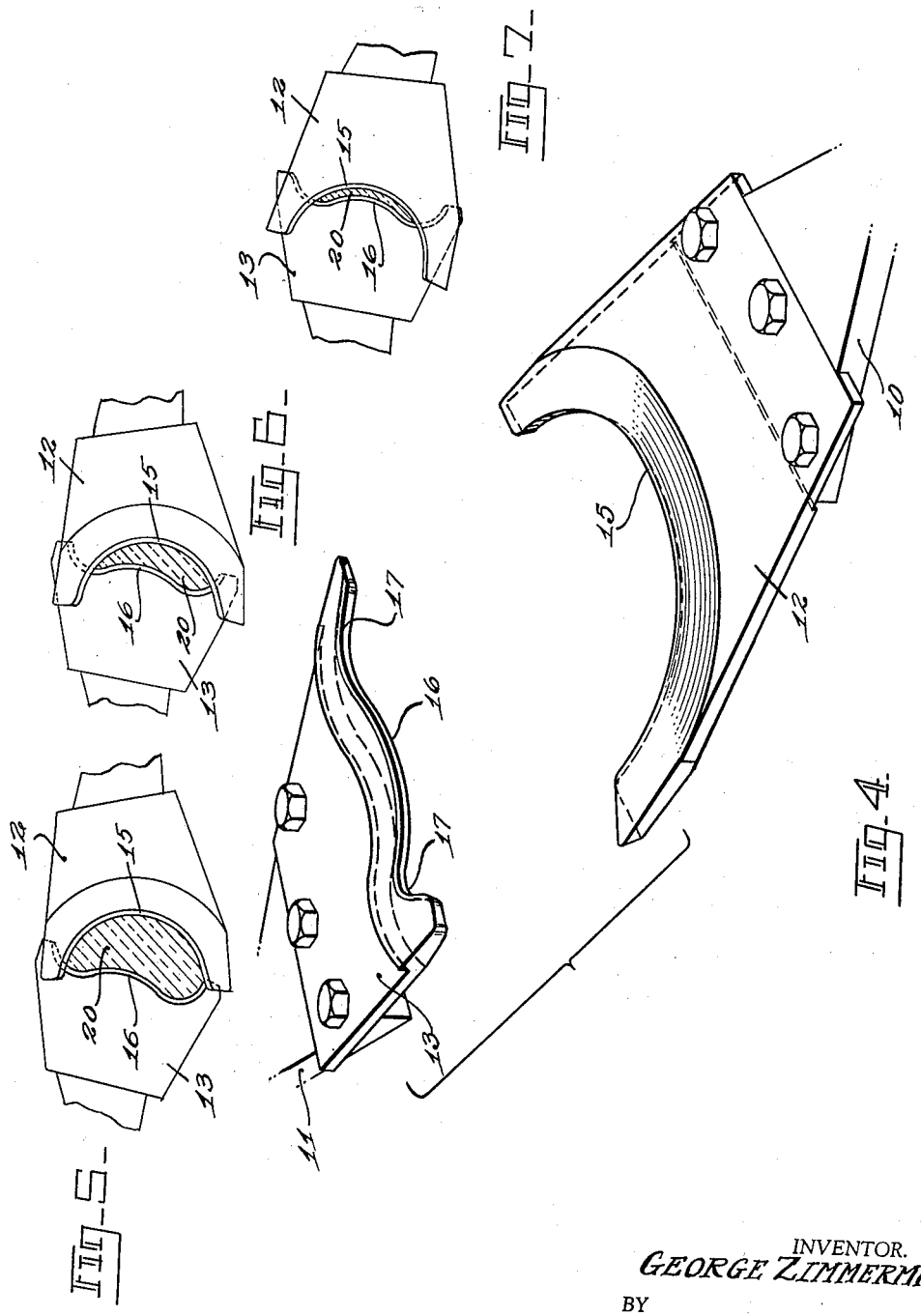
INVENTOR.
GEORGE ZIMMERMAN
BY
ATTORNEYS

2,920,421

SHEARS FOR SEVERING MOLD CHARGES OF PLASTIC GLASS

George Zimmerman, Columbus, Ohio, assignor to Kimble Glass Company, a corporation of Ohio Application May 31, 1957, Serial No. 662,692

1 Claim. (Cl. 49—14)

My invention relates to shear mechanism particularly adapted for severing mold charges or gobs of glass in a molten or plastic condition as the glass issues from a supply body.

In the manufacture of various molded glass articles it is common practice to flow the molten glass through a bottom outlet in the forehearth of a furnace tank. The glass as it issues, under the control of suitable gob forming mechanism, is suspended from the walls of the outlet. The glass is periodically severed beneath the outlet into individual mold charges or gobs which drop or are guided into forming molds. Ordinarily the gobs are severed by a pair of shears having V-shaped cutting edges which, as the shears move together into overlapping relation, surround and sever the suspended glass. The surface of the glass issuing into the open air is immediately chilled forming a sack or skin of chilled glass enveloping the gob. During the operation of severing with conventional shears the cutting edges of the shears contact the glass at spaced intervals around the body of glass and as the glass is gradually severed there is a squeezing of the glass in a manner to cause more or less wrinkling of the chilled surface skin or sack. This uneven chilled surface layer appears as a defect in the finished ware.

An object of the present invention is to substantially eliminate such unevenness and thereby prevent the appearance of scars or chill marks in the finished ware. For the attainment of this object I provide shears having specially contoured cutting edges which contact with the entire perimeter of the glass during the severance and operate to sever the chilled surface skin of glass practically instantaneously. The shears are so designed that a major portion of the contoured cutting edges as they approach each other are substantially parallel.

In the preferred form of the invention one of the blades has a major portion of its edge concave in substantially an arc of a circle. The opposite blade has its edge in the form of a compound curve including an intermediate convex portion merging into concave edge portions. The shape of the edges of the blades is such that as they are being brought together and grip the suspended body of glass they form a substantially kidney-shaped contour and impart to the glass a corresponding shape at the plane of severance. The continued shearing movement of the blades then operates substantially throughout the perimeter of the glass for instantaneously severing the chilled skin of glass without wrinkling or unevenness.

Referring to the accompanying drawings:

Fig. 4 is a perspective view of the shears in open position; and

Figs. 5, 6, and 7 are fragmentary views showing successive steps during the severing operation.

Figure 1:
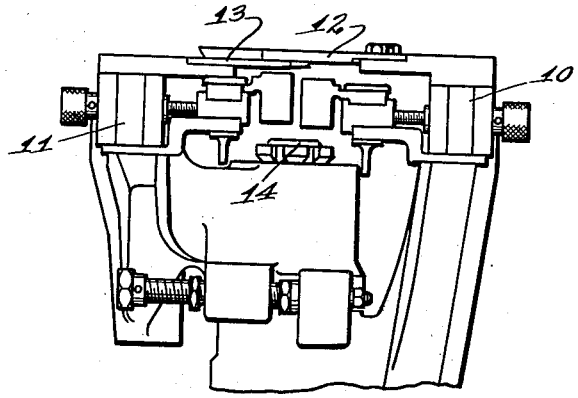
Fig. 1 is an elevational view of a glass shearing mechanism.
Figure 2:
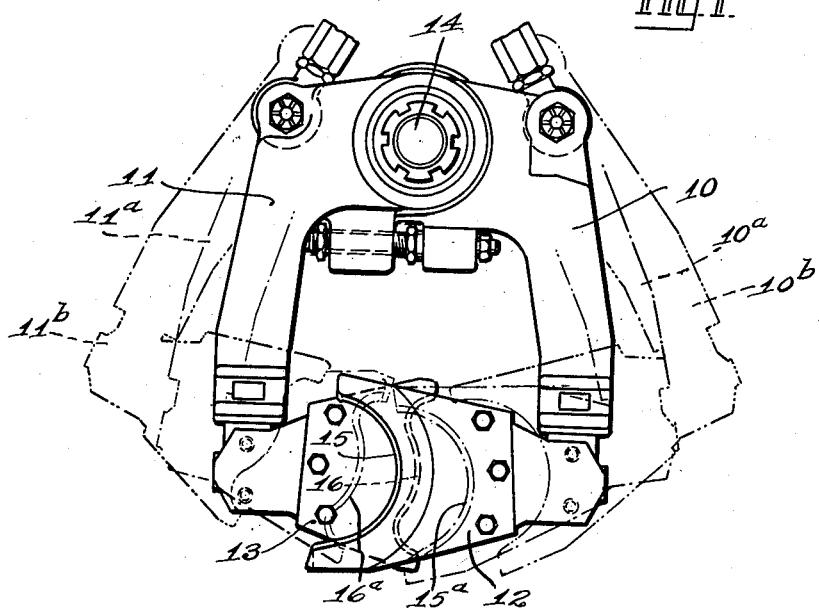
Fig. 2 is a plan view of the same.
Figure 3:
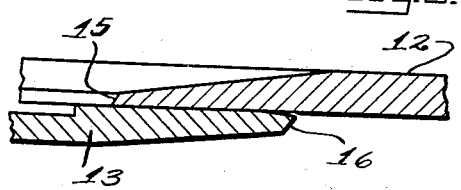
Fig. 3 is a fragmentary detail view on a comparatively large scale showing the shears in overlapping relation.

Referring to Figs. 1 and 2, the shear mechanism, except as it relates to the form of the shear blades, may be of well known or conventional construction and mode of operation. This construction includes a pair of shear arms 10 and 11 to which are attached shear blades 12 and 13 respectively. The shear arms are mounted to swing about the axis of a pivot pin 14, the arms being interconnected to swing in unison. The upper shear blade or plate 12 is formed with a shearing edge 15 extending approximately the full width of the plate 12. The edge 15 is concave and forms an arc of a circle or is approximately semicircular.

The edge of the lower blade 13 forms a compound curve including an intermediate arc-shaped convex curve 16 merging into concave portions 17 which extend approximately to the outer side edges of the blade 13. The radius of curvature of the convex section 16 may be equal to or substantially equal to the radius of curvature of the edge 15 of the blade 12.

The form or contour of the edges of the blades is such that as the blades move to overlapping relation the end portions of the concave edge 15 intersect the curves 17 at intermediate points. This relation of the cutting edges is shown in Fig. 2 in which the edges of the blades are shown in broken lines 15ᵃ and 16ᵃ. The cutting edges of the blades thus completely surround the suspended body of glass, the contour of the overlapping blades defining a substantially kidney shape area and the blades operating to give a corresponding shape to the glass at the plane of severance.

Fig. 5 shows the sectional shape imparted to the glass 20 as the cutting edges of the blades meet during the shearing movement, the shears being in contact with the glass throughout its perimeter. Continued movement of the shears operates to sever the skin of chilled glass enveloping gob without substantially wrinkling, distorting or drawing such skin of glass out of its smooth shape and uniform thickness. As the shears continue their shearing movement the glass is gradually severed. Fig. 6 shows the parts in an intermediate position during this severance. Fig. 7 shows the relation of parts as the severing operation is about completed. As shown in this view the convex shearing edge portion 16 of the lower blade is substantially parallel with the concave edge 15 of the upper blade. Thus, the final severance of the gob takes place simultaneously throughout the extent of the parallel edges of the blades. This may represents the major portion of the entire perimeter of the glass which is being severed.

In Fig. 2 the shear arms and blades are shown in full lines in their closed position at the completion of the severing stroke. The shear arms are shown at an intermediate position in broken lines 10ᵃ and 11ᵃ and in their outermost or open positions in broken lines 10ᵇ and 11ᵇ.

Summarily, the shear blades may also be described as follows: both first and second blades have shearing edges residing in essentially the same plane. The cutting edge of the first blade is concave and forms substantially an arc of a circle. The second blade has a cutting edge having the contour of a compound curve including an intermediate convex portion forming an arc of a circle of substantially equal radius to that of the concave edge of the first blade but having a shorter arcuate dimension. The compound curve of the second blade has end portions which sweepingly merge and extend into a reverse concave curvature with respect to the intermediate convex portion. The blades are shaped so that when in initial shearing relation during their closing arrangement, the concave edge of the first blade initially overlaps the end portions of the second blade with the meeting points of the two blades forming angles not substantially less than a right angle. At this interval the edges of the several blades form the perimeter of a closed substantially kidney-shaped space. Upon further closing of the blades the intermediate convex portion of the second blade is substantially parallel with the concave edge of the first blade as they approach each other. Thus, the actual shearing movement of the blades occurs as the convex intermediate portion and concave edge meet along a substantially arcuate line and final shearing action is effected at such time.

Modifications may be resorted to within the spirit and scope of my invention as defined in the appended claim.

I claim:

Shear mechanism comprising a pair of shear arms, shear blades including a first blade and a second blade carried on said arms respectively, means for mounting said arms for moving the blades in a shearing plane from an open position in which the blades are separated to a closed position in which the blades are in overlapping relation with their shearing edges in the shearing plane, said first blade having a shearing edge lying in said plane, said edge being concave and forming substantially an arc of a circle, the second blade having a shearing edge lying in the said plane and being in the form of a compound curve including an intermediate convex portion forming an arc of a circle of substantially equal radius to that of said concave edge but of less extent that said concave edge, the compound curve including end portions merging into and extending from said intermediate portion and of reverse curvature with respect to said intermediate portion, the said edges of the blades being so shaped that when they are in an initial shearing relation during the closing movement of the blades the concave edge of the first blade first overlaps the said end portions of the second blade, with the edge portions of the blades at their meeting points when in said initial shearing relation, forming angles not substantially less than a right angle and the edges of the blades forming the perimeter of a closed, substantially kidney shaped space, the said intermediate edge portion of the second blade being substantially parallel with the concave edge of the first blade as the edge portions approach each other during the shearing movement so that said convex portion and concave edge meet along substantially a single arc-shaped line in said plane as the blades are completing their shearing movement.

References Cited in the file of this patent

UNITED STATES PATENTS

| | | |
|---|---|---|
| 1,444,327 | Byrd | Feb. 6, 1923 |
| 1,462,197 | Fellroth | July 17, 1923 |
| 2,174,585 | Kotzich | Oct. 3, 1939 |
| 2,218,970 | Honiss | Oct. 22, 1940 |

FOREIGN PATENTS

| | | |
|---|---|---|
| 1,216 | Great Britain | 1905 |